US005270085A

United States Patent [19]

Horiki et al.

[11] Patent Number: 5,270,085

[45] Date of Patent: Dec. 14, 1993

[54] MASKING MEMBER

[75] Inventors: Seinosuke Horiki; Reiji Makino, both of Nagoya; Kenji Ikeda, Tokai, all of Japan

[73] Assignee: Nagoya Oilchemical Co., Ltd., Nagoya, Japan

[21] Appl. No.: 778,852

[22] PCT Filed: Apr. 25, 1991

[86] PCT No.: PCT/JP91/00567

§ 371 Date: Dec. 23, 1991

§ 102(e) Date: Dec. 23, 1991

[87] PCT Pub. No.: WO91/16140

PCT Pub. Date: Oct. 31, 1991

[30] Foreign Application Priority Data

Apr. 26, 1990 [JP] Japan ................................... 2-44774

[51] Int. Cl.[5] ................................................ B32B 1/00

[52] U.S. Cl. ..................................... 428/34.1; 428/99; 118/505; 118/504

[58] Field of Search ....................... 428/99, 34.1, 36.5, 428/35.7; 118/505, 504

[56] References Cited

U.S. PATENT DOCUMENTS

| | | | |
|---|---|---|---|
| 3,393,597 | 7/1968 | Hoaglund | 118/505 |
| 4,764,421 | 8/1988 | Horiki et al. | 118/505 |
| 4,879,158 | 11/1989 | Horiki et al. | 118/505 |

FOREIGN PATENT DOCUMENTS

| | | |
|---|---|---|
| 76881 | 5/1982 | Japan . |
| 199173 | 12/1987 | Japan . |
| 202384 | 12/1987 | Japan . |

*Primary Examiner*—Alexander S. Thomas

*Attorney, Agent, or Firm*—Cooper & Dunham

[57] ABSTRACT

The object of the present invention is to perform easily the automatic attaching of a masking member which is inserted into a hole to protect said hole from a surface treatment. For said object, in the present invention, a tapering guide part is extended from the top of the inserting part of said masking member and even if said masking member is located in a deflecting position from the correct position in front of said hole, said deflecting position may be adjusted to the correct position by said guide part coming into contact with the circumference of said hole.

3 Claims, 3 Drawing Sheets

MASKING MEMBER

FIELD OF THE INVENTION

The present invention relates to a masking member which temporarily protects a hole of an article from a surface treatment.

For instance, an anti-corrosion treatment is performed on the steel panel of the floor of a car and occasionally, the anti-corrosion film on said steel panel has received damage through the collision of flying small stones or sand during and when the car is moving. This is called the chipping phenomenon and to prevent this phenomenon, a visco-elastic paint such as polyvinylchloride sol, tar-urethane, and the like is coated on the back of said steel panel.

Nevertheless, said steel panel of the floor of a car has many holes such as cable holes, drainage holes, shaft holes and the like and it is necessary to prevent said visco-elastic paint from entering into said holes.

DESCRIPTION OF THE PRIOR ART

Hitherto, a method wherein a plug-type masking member is inserted into each of said holes has been provided to prevent said visco-elastic paint from entering into said holes (Tokkai Sho 62-199173).

In a continuous mass production process such as the car-manufacturing process, it is preferable to use a robot when said masking member is inserted into one of said holes. Recently, a method wherein said masking member is sucked by a sucker equipped on a robot to automatically insert said masking member into said hole has been provided (Japanese Patent Application SN. 1-170880).

Nevertheless, when said plug-type masking member is automatically inserted into said hole by said robot, said masking member should be located correctly in front of said hole, and for this purpose, the precise operation of said robot is required. Further, when said masking member is inserted into said hole by a worker's hand, it may require much labor to fit said masking member into the correct position and the working efficiency may be inferior.

DISCLOSURE OF THE INVENTION

The present invention provides a masking member (1) consisting of an inserting part (2) and a tapering guide part (3) extending from the top of said inserting part (2) as a means to resolve said prior problem.

When said masking member (1) of the present invention is inserted into a hole (6) by such as a robot and the like, in a case where said masking member (1) is located in a deflecting position from the correct position in front of said hole (6), said tapering guide part (3) of said masking member (1) may come into contact with the circumference of said hole (6) when said masking member (1) is inserted into said hole (6) to adjust the position of said masking member (1) to the correct position, and then the inserting part (2) of said masking member (1) may be inserted into said hole (6).

Accordingly, in the present invention, even if said masking member is located in a deflecting position from the position in front of said hole before inserting, said masking member is certainly inserted into said hole and the precise operation of the robot may not be necessary and the structure of the robot can be simplified. Further, in a case where said masking member is inserted into said hole by a worker's hand, the position of the masking member may be easily adjusted and the working efficiency becomes higher.

BRIEF DESCRIPTION OF THE DRAWINGS

FIG. 1 is a perspective view.

FIG. 2 is a side view before the insertion of a masking member.

FIG. 3 is a side view when said masking member is being inserted.

FIG. 4 is a side view after the insertion of said masking member.

Figure 1:
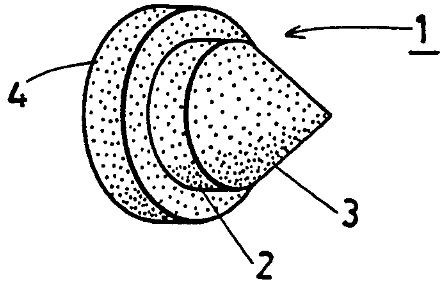
FIGS. 1 to 4 each show an embodiment of the present invention.

In the DRAWINGS, (1), (1)A, (1)B, (1)C . . . masking member (2), (2)A, (2)B, (2)C . . . inserting part (3), (3)A, (3)B, (3)C . . . guide part

DESCRIPTION OF THE INVENTION

Describing the present invention by the embodiments shown in FIGS. 1 to 4, a masking member (1) consists of a flange part (4), an inserting part (2) and a guide part (3) extending from the top of said inserting part (2) and said inserting part (2) is tapered in which the diameter of said inserting part (2) gradually decreases towards the top, and said guide part (3) has a conical shape in which the diameter of said guide part (3) gradually decreases towards the top.

Figure 2:
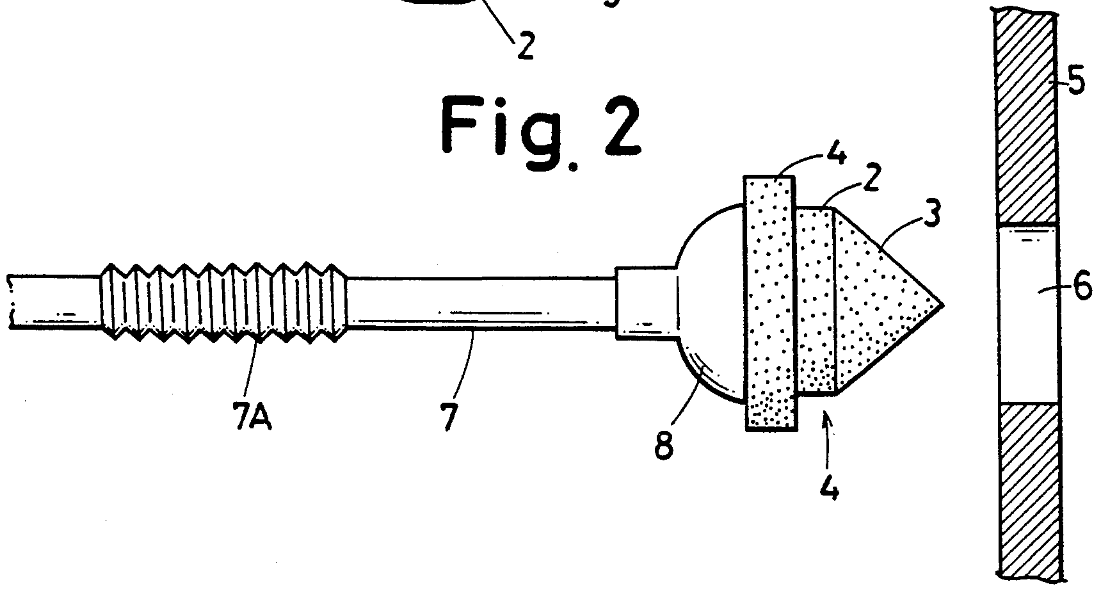
Figure 3:
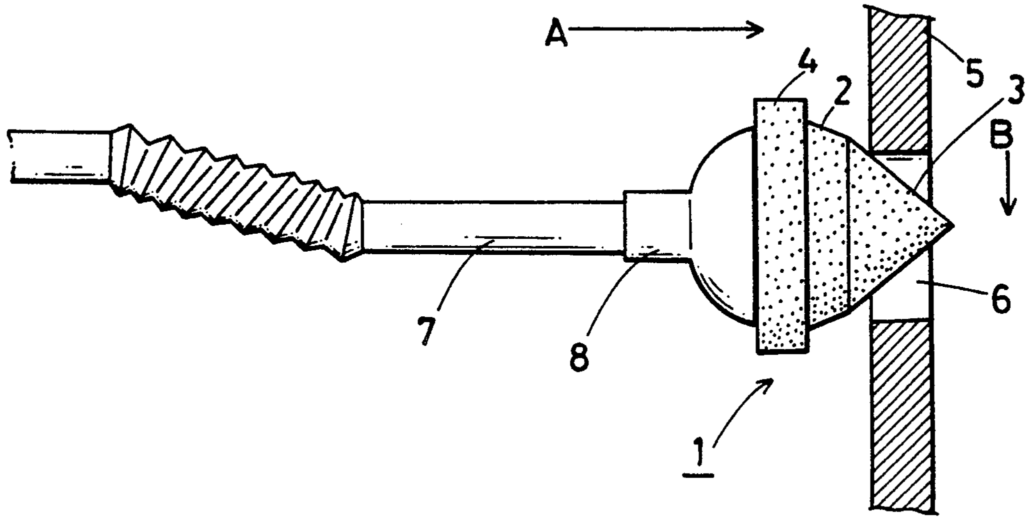

Said masking member (1) is sucked by a sucker (8) of a robot which is attached to the top end of a vacuum-ventilation pipe (7) to the robot end of which a bellows flexible pipe (7)A is connected as shown in FIG. 2, and said masking member (1) is located in front of a hole (6) of an article (5), and in a case where said masking member is located in a deflecting position, said deflecting position of said masking member (1) may be corrected to the direction shown by the arrow B in FIG. 3, by contacting said guide part (3) of said masking member (1) to the circumference of said hole (6) when said masking member (1) is inserted into said hole (6) by said robot as shown by the arrow A in FIG. 3.

Figure 4:
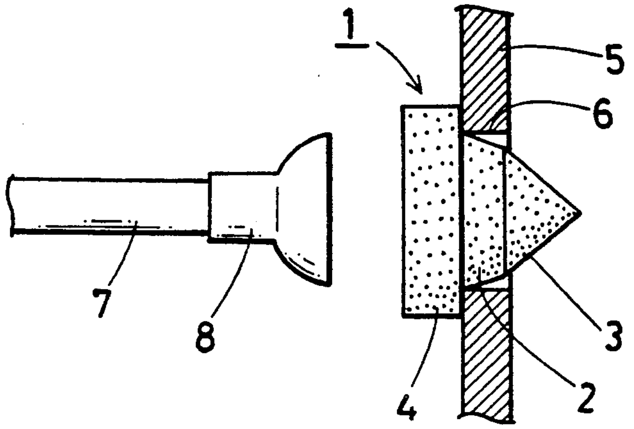

As said masking member (1) is held by said bellows flexible pipe (7)A through said vacuum-ventilation pipe (7), said masking member (1) can be easily moved in the x-y direction. Instead of said bellows flexible pipe (7)A, a coil spring and the like may be used. In the end of the insertion process of said masking member (1), said masking member (1) may be pressed into said hole (6) by allowing air pressure into said sucker (8) through said vacuum-ventilation pipe (7). Thus, said masking member (1) is inserted into said hole (6) as shown in FIG. 4.

Figure 5:
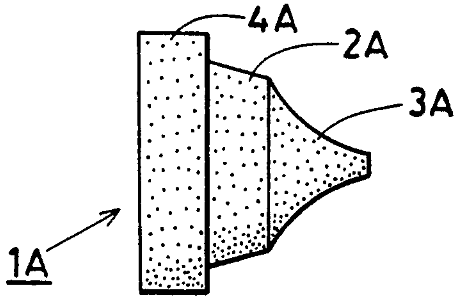
FIG. 5 is a side view of another embodiment.

FIG. 5 shows a masking member (1)A of another embodiment of the present invention. Said masking member (1)A consists of a flange part (4)A, a tapering inserting part (2)A in which the diameter gradually decreases towards the top, and a tapering guide part (3)A in which the diameter parabolically decreases towards the top.

Figure 6:
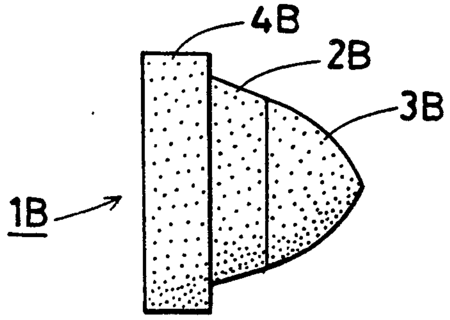
FIG. 6 is a side view of still another embodiment.

FIG. 6 shows a masking member (1)B of still another embodiment of the present invention. Said masking member (1)B consists of a flange part (4)B, a tapering inserting part (2)B in which the diameter gradually decreases towards the top, and a bullet-like guide part (3)B in which the diameter parabolically decreases towards the top.

Figure 7:
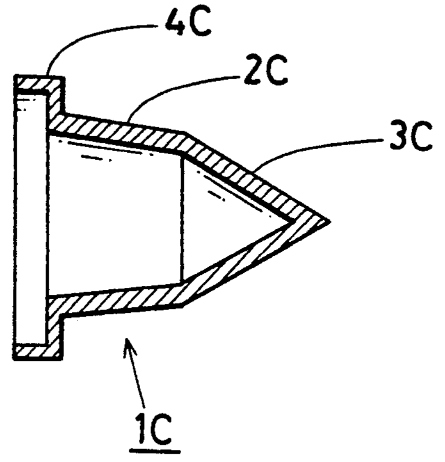
FIG. 7 is a side sectional view of still another embodiment.

FIG. 7 shows a masking member (1)C of a further embodiment of the present invention. Said masking member (1)C is a vessel-type and consists of a flange part (4)C, a tapering inserting part (2)C in which the diameter gradually decreases towards the top, and a conical guide part (3)C.

A masking member of the present invention is made of a plastic such as polystyrene, polyethylene, polypropylene, polyvinyl-chloride, polyurethane, melamine resin, urea resin, phenol resin and the like, a reinforced plastic wherein an inorganic filler such as calcium carbonate, talc, bentonite and the like is mixed in said plastic, a foamed plastic of said plastic, a synthetic rubber such as styrene-butadiene rubber, a crylonitrile-butadiene rubber and the like, a natural rubber, a molded fiber material wherein wood fiber, synthetic fiber, natural fiber, inorganic fiber etc. is bound by a binder to mold wood, paper, reclaimed paper, corrugated card-board, metal, and a complex or a laminate of two or more of said materials.

Figure 8A:
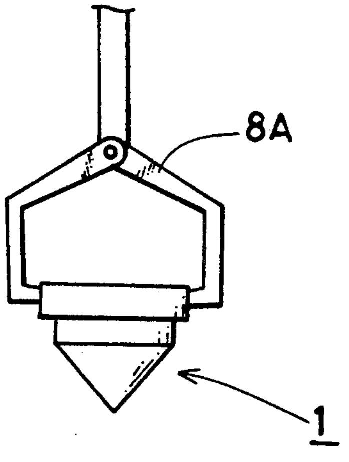
FIGS. 8, A and B are respectively side views of holders of said masking member for other embodiments.
Figure 8B:
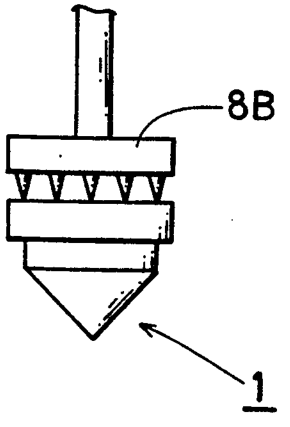

Further, to attach said masking member (1) of the present invention, besides said sucker (8), for instance, a pinch-type holder (8)A as shown in FIG. 8, A, a needle-type holder (8)B as shown in FIG. 8, B and the like may be used.

We claim:

1. An assembly for masking an opening in an article which comprises a plug-type masking member comprising a front, tapered, conical portion and a rear flanged portion, said rear flanged portion providing a rear, flat, planar surface, a suction cup contacting and holding suction said masking member by suction attachment in contact with said rear, flat planar surface of said rear flanged portion of said masking member, and a hollow, elongated member attached to said suction cup for applying suction to said suction cup in contact with said rear flat planar surface of said masking member and for venting said suction cup to relieve suction therein, said elongated member provided with flexible means for adjustably positioning and centering said suction cup with attached masking member to position said masking member within said opening of said article to be masked.

2. An assembly in accordance with claim 1 wherein said hollow, elongated member comprises a bellows.

3. An assembly in accordance with claim 1 wherein said hollow, elongated member comprises a coil spring.

* * * * *